United States Patent
Gabriel

(10) Patent No.: US 6,669,233 B2
(45) Date of Patent: Dec. 30, 2003

(54) BODILY-INJURY PROTECTIVE SYSTEM OF PILLOWS LOCATED WITHIN A VEHICLE

(76) Inventor: Edwin Zenith Gabriel, 91 Mt Tabot Way, Ocean Grove, NJ (US) 07756

( * ) Notice: Subject to any disclaimer, the term of this patent is extended or adjusted under 35 U.S.C. 154(b) by 17 days.

(21) Appl. No.: 09/770,485

(22) Filed: Jan. 29, 2001

(65) Prior Publication Data

US 2002/0109342 A1 Aug. 15, 2002

(51) Int. Cl.$^7$ .............................................. B60R 21/055
(52) U.S. Cl. ........................ 280/751; 280/731; 280/750
(58) Field of Search .................... 280/731, 750, 280/751, 752

(56) References Cited

U.S. PATENT DOCUMENTS

| | | | | |
|---|---|---|---|---|
| 2,834,606 A | * | 5/1958 | Bertrand ................... | 280/730.1 |
| 3,189,367 A | * | 6/1965 | Glass ......................... | 280/750 |
| 3,936,075 A | * | 2/1976 | Jelliffe ........................ | 280/751 |
| 4,032,175 A | * | 6/1977 | Aibe et al. .................. | 280/751 |
| 4,287,621 A | * | 9/1981 | Kertz ............................ | 5/636 |
| 4,368,901 A | * | 1/1983 | Kojima ....................... | 280/748 |
| 4,449,728 A | * | 5/1984 | Pilatzki ...................... | 280/731 |
| 5,114,181 A | * | 5/1992 | Songer ....................... | 280/750 |
| 5,114,185 A | * | 5/1992 | Reedom .................... | 280/801.1 |
| 5,174,599 A | * | 12/1992 | Hull et al. .................. | 280/731 |
| 5,201,543 A | * | 4/1993 | Hull et al. .................. | 280/750 |
| 5,415,428 A | * | 5/1995 | Koide et al. ............. | 280/728.3 |
| 5,449,196 A | * | 9/1995 | Ohno et al. ............... | 280/728.3 |
| 5,480,184 A | * | 1/1996 | Young ......................... | 280/731 |
| 6,042,140 A | * | 3/2000 | Blazaitis et al. .......... | 280/728.3 |

* cited by examiner

Primary Examiner—Paul N. Dickson
Assistant Examiner—Toan C To

(57) ABSTRACT

Air bags in vehicles, upon exploding when a collision occurs, can injure one's face and head. To avoid such bodily injury to a motorist, one or more soft pillow of the proper size are attached to the top of the steering wheel. The pillows, with rip-resistant, fire and water resistant enclosures, may be removably attached to the steering wheel by means of either velcro or snap-on fasteners. Such pillows for bodily-injury protection may be attached to other passenger-injury, vulnerable locations of a vehicle, removably fastened. In the event of a collision with an object, now the soft pillows attached to plastic cover will strike the person first instead of the air bag's solid plastic cover. The top of a soft pillow, with perhaps an elastic, expandable puncture-resistant enclosure, could be ornately, colorfully, pleasingly decorated with flowers, birds, butterflies, berries. A pillow may be attached to a steering wheel without an air bag, using the illustrated and described straps for fastening.

11 Claims, 5 Drawing Sheets

BODILY-INJURY PROTECTIVE SYSTEM OF PILLOWS LOCATED WITHIN A VEHICLE

This is not a continuation-in-part of a previous application, and not a co-pending.

RIGHTS TO INVENTIONS MADE UNDER FEDERALLY-SPONSORED RESEARCH AND DEVELOPMENT

None of the work on this invention was performed under any Federally-Sponsored or State-Sponsored research and development. Gabriel used his own resources on every phase of his project.

BACKGROUND OF THE INVENTION

1. Field of the Invention

This invention is in the field of the avoidance of bodily injury for passengers in a vehicle, should a collision occur. Specifically it is on improving the vehicle's air-bag protection system. Presently, when the air bag suddenly inflates, its plastic cover plate flies out disintegrating and its pieces could injure a motorist or his passenger. With the improvement to the air-bag, the motorist is protected from injury by a pillow added-on and attached to the cover plate. The pillow's enclosure is rip-resistant, elastic or expandable, water and fire resistant, as well as replaceable, when worn and needing repairs. Similar pillows may be mounted at other injury vulnerable locations of the vehicle. No matter where they may be mounted, the pillows are removably-attached to a surface, so they may be replaced. The top surfaces of the bags could be decorated colorfully with pleasing patterns, including flowers.

2. Description of Prior Art

The inventor is only aware of patents pending and issued under his name that relates to his present invention. The pending patents are Ser. No. 09/722236, dated Nov. 27, 2000 and Ser. No. 09/752,920, dated Jan. 2, 2001, entitled, "Bodily-Injury Protective Clothing and Accessories for Outdoors and In A Vehicle". He does not have any issued patents on this subject matter. Regarding protective clothing for forceful impact, one could refer to U.S. Pat. No. 5,477,558 dated Dec. 26, 1995, and U.S. Pat. No. 4,089,065, dated May 16, 1978.

SUMMARY OF THE INVENTION

The auto air bag has been known to cause injury to the motorist's head when suddenly inflating, sometimes causing one's nose to break.

A simple technique has been devised to avoid bodily injury to a motorist or to his passenger when an air bag inflates. The technique is to attach a pillow to the top of the steering wheel or to the top of any air bag plastic cover in the vehicle. Thus, when the plastic cover flies off to allow the air bag to inflate, the pillow strikes the head first, instead of the plastic. Thus, the motorist is spared injury. The pillow may be attached to the top of the concealed auto air bag, by either velcro strips, by snap-on fasteners or by any other convenient means, so it can be replaced, when worn or soiled. The pillow's cover would be water and puncture resistant, and could be decorative, so as to be pleasing to the eye and match the coloring and decorations inside the vehicle. The plastic cover breaks into two equal pieces when the air bag inflates. Hence, in the final design, the protective pillow has been divided into two pillows, one pillow to go with half of the plastic cover and the other pillow with the other half, when the air bag suddenly inflates.

BRIEF DESCRIPTION OF DRAWINGS

For the purpose of illustrating the bodily-injury protection technique for preventing the auto bag from hurting the motorist when suddenly inflating, the following drawings show forms which are presently preferred.

DESCRIPTION OF A PREFERRED EMBODIMENT

FIGS. 1 to 4A show different views of pillows for attachment to the covers of auto air-bags, for bodily-injury protection of auto passengers in case of the sudden inflation of the auto's air bag.

Figure 1:
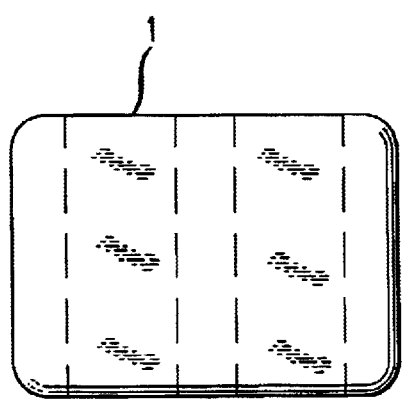
FIG. 1 is a top view of the pillow.
Figure 2A:
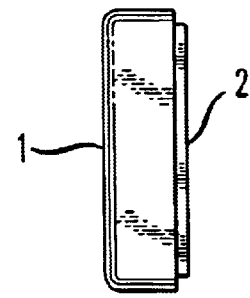
FIG. 2A is another side view showing the location of the Velcro strips, underneath the pillow.
Figure 2:
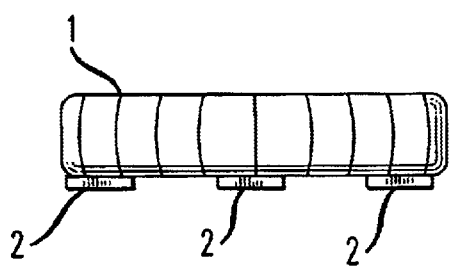
FIG. 2 is a side view thereof.

FIGS. 1 to 2A show the top, and side views of one configuration of the pillow 1 in which the pillow's bottom side is attached to the air bag's cover by means of Velcro strips 2. FIG. 1 is the bag's top view, while FIGS. 2 and 2A are side views, showing locations of Velcro strips 2.

Figure 3:
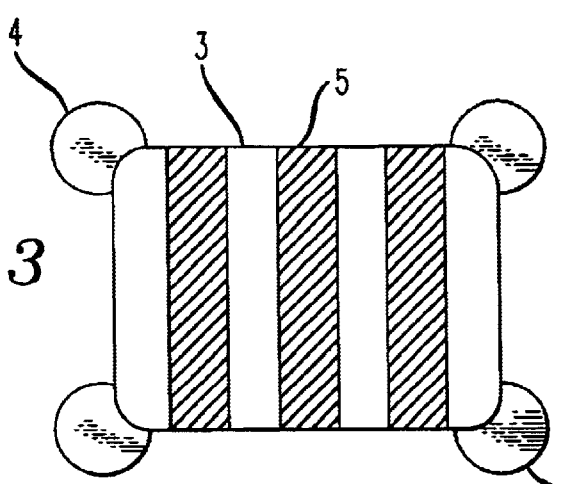
FIG. 3 is another top view of the pillow.
Figure 4A:
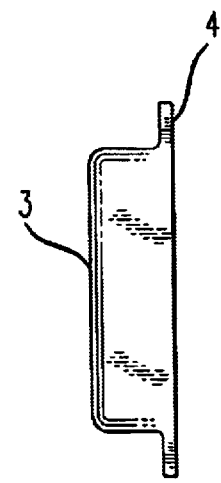
FIG. 4A is another side view of the pillow.
Figure 4:
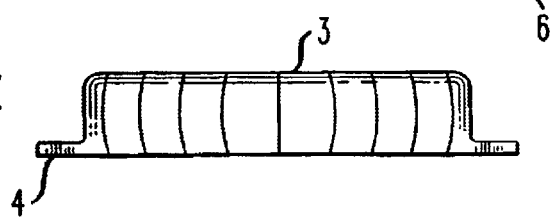
FIG. 4 is a side view thereof, showing ears at its four corners, with snap-on fasteners attached. The auto air bag's cover would have the bottom portions of the fasteners attached, so the snap-on fasteners could be attached thereto, and that the pillow could be removable.

FIGS. 3 to 4A show the top and side views of another configuration of pillow 3, in which the pillow is attached to the air bag's cover by means of snap-on fasteners, so the air bag would be removable and replaced. In FIG. 3, the top view, pillow 3 is shown with green strips and has a ear 4 at each corner with snap-on fasteners 6 attached. FIG. 4 shows a side view of pillow 3 with ears 4, while FIG. 4A shows another side view of pillow 3.

Figure 5:
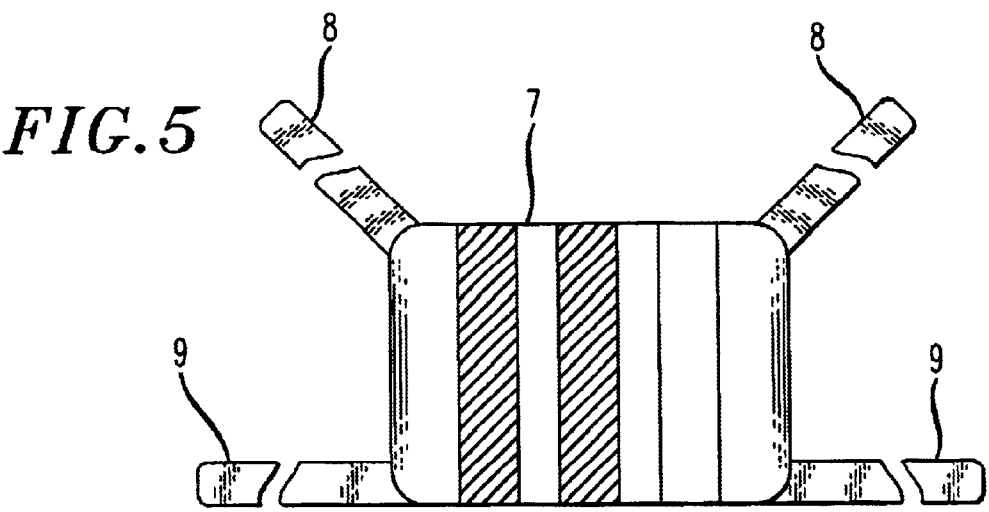
FIG. 5 is a top view of the pillow with straps extending from its four corners.

FIG. 5 shows a top view of pillow 7 with straps 8 and 9 attached to its four corners. These straps could be Velcro straps and these pillows could be placed in other injury susceptible interior portions of the vehicle, other than the top of the steering wheel.

Figure 6:
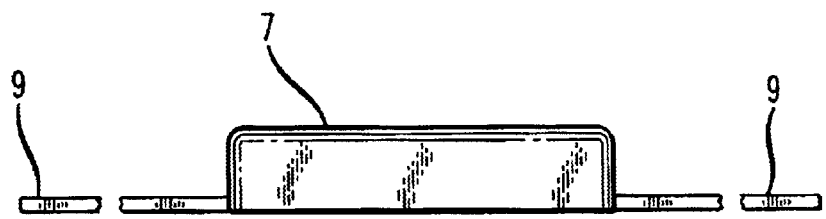
FIG. 6 is a side view thereof.

FIG. 6 is a side view thereof.

Figure 7:
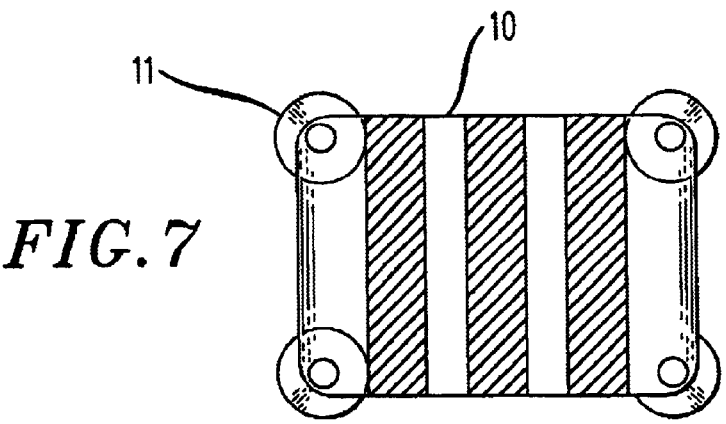
FIG. 7 is a top view of the pillow with suction cups fastened, one at each of its four corners.
Figure 8:
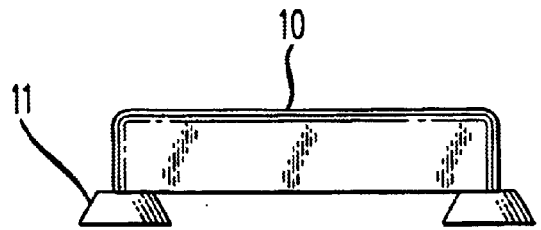
FIG. 8 is a side view thereof.

FIG. 7 shows a top view of pillow 10, decorated with stripes. This pillow has suction cups 11 mounted, one at each one of its corners. This pillow could be placed in other injury susceptible interior portions of the vehicle, other than the top of the steering wheel, as shown in FIG. 9.

Figure 9:
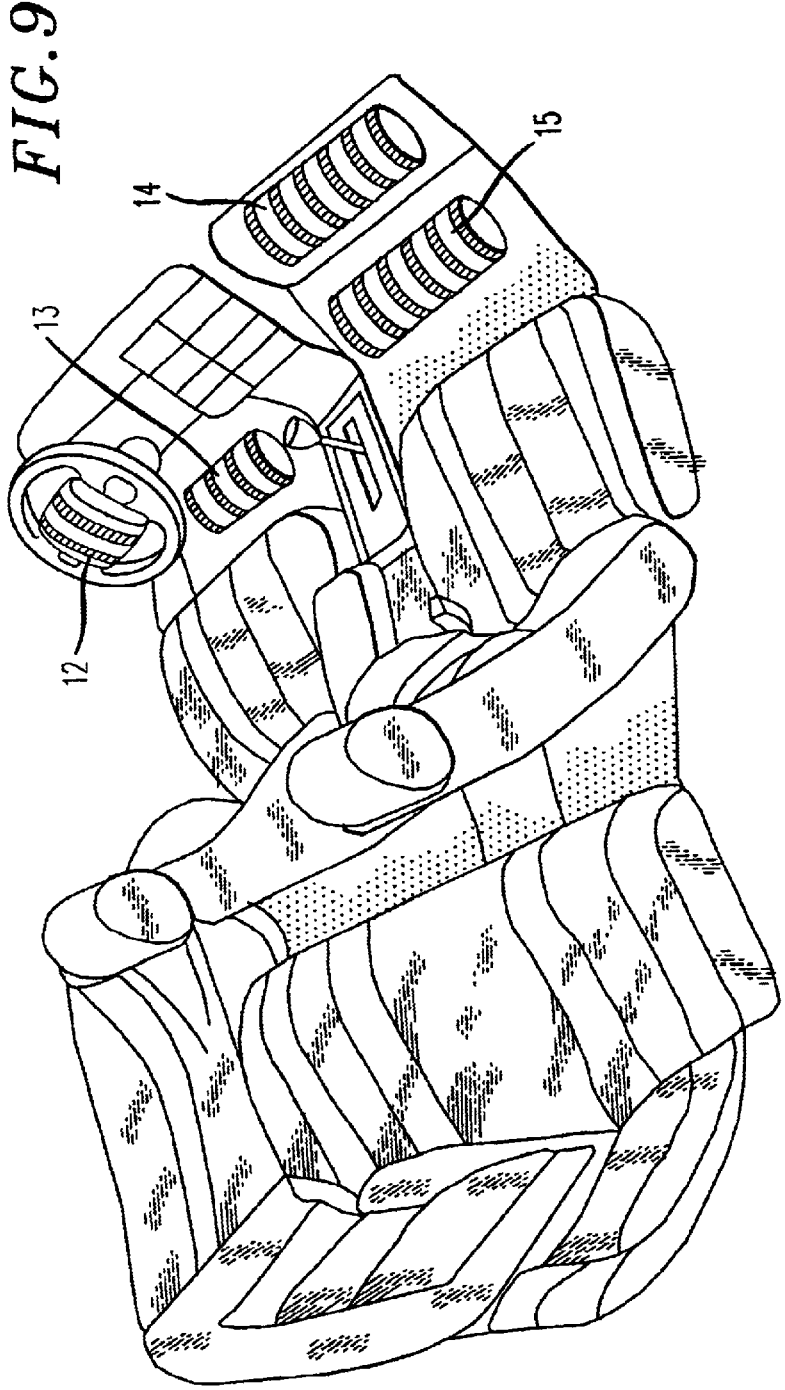
FIG. 9 shows a three-dimensional picture of a vehicle's interior with energy-absorbing pillows mounted on critical positions, including on the steering wheel, to avoid bodily injury of occupants in the event of a collision with an object.
Figure 10:
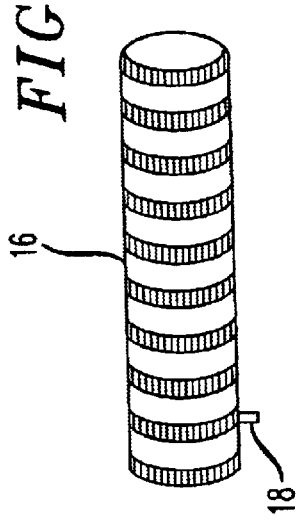
FIG. 10 shows a perspective side view of an elongated pillow which can be inflated.
Figure 11:
FIG. 11 is a two-dimensional end view of the pillow of FIG. 10.

FIG. 9 shows the three-dimensional interior of a vehicle with a pillow such as shown in FIG. 1 with Velcro strips adhering to clinging pile on the plastic surface of the auto air bag cover. FIG. 10 shows an elongated air bag 16, decorated with stripes. This bag can be inflated with air via air valve 18. This bag shows a Velcro strip 17 in FIG. 11 attached to its back side for adhering to clinging pile. Variations of this air bag in site are shown in the vehicle's interior, FIG. 9, at various injury vulnerable locations and identified by numerals 13, 14 and 15.

If the auto does not have an inflatable air bag, pillow 7, shown in FIG. 5, could still be attached to the steering wheel by Velcro straps 8 and 9, so a person's head would hit the pillow instead of the bare steering wheel or the auto's windshield. Simultaneously, either pillow 1 or pillow 16, FIG. 10, could be installed in front of the passenger's side of the auto, as shown in FIG. 9, with Velcro adhering to clinging pile on the surface to which either pillow 7 or pillow 16 would be attached.

DESCRIPTION OF ANOTHER PREFERRED EMBODIMENT

Figure 12:
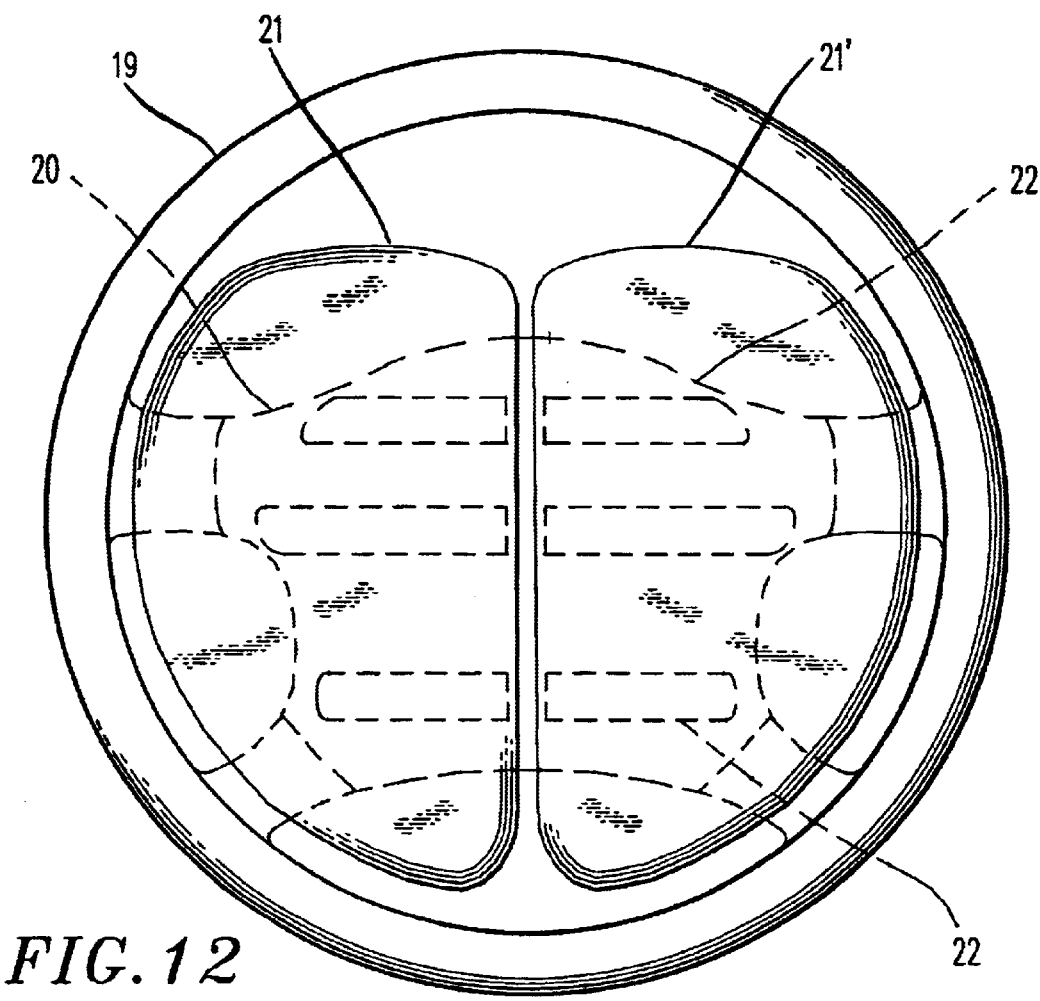
FIG. 12, is a plan view of a steering wheel with an auto air-bag inside its column and with two pillows on top.
Figure 13:
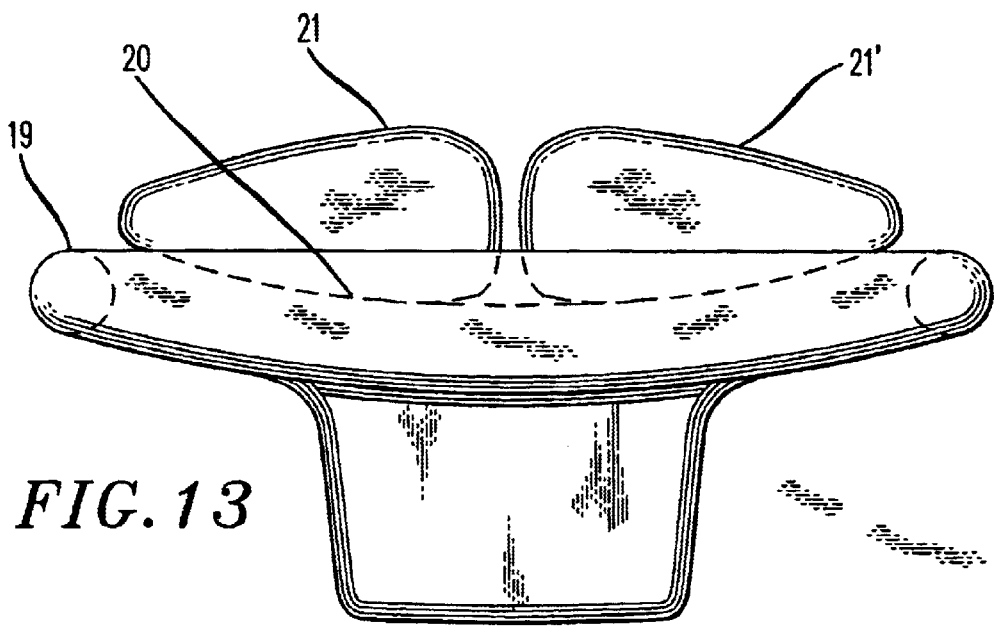
FIG. 13 is a side view thereof.

When an auto air bag suddenly inflates, its plastic cover breaks into two pieces which fly in opposite directions. Consequently, it is desirable to have two smaller pillows, side by side on the vehicle's steering wheel, as shown in FIGS. 12 and 13, the top and side views, respectively. FIG. 13 is a side view of FIG. 12, showing pillows 21 and 21', side by side, attached to the plastic cover by either Velcro or snap-on fasteners, located underneath pillows 21 and 21'. The velcro 22 is shown in dashed lines, FIG. 12. The outside diameter of wheel 19 of some vehicles, such as the GEO PRIZM by GM measures 14 ⅝ inches. That would mean pillows 21 and 21' need to be smaller in size on their longer dimensions, to fit inside the wheel's rim, as shown in FIG. 12. Their height, shown in FIG. 13 has a limitation, too, in order not to obscure the motorist's view in front. Their height needs to be sufficient to provide head and face injury protection, when the air bag suddenly inflates. The two pillows would be filled with soft cotton, sponge rubber or other energy-absorbing soft material. The pillows' covers need to be water, puncture and rip resistant, as well as being non-inflammable, such as Cornell/Robbins reinforced bags, item O FLAT, size 6" by 10". The air bag's plastic cover is identified by numeral 20, FIGS. 12 and 13. The two pillows are removable by simply pulling up on pillows 21 and 21', by their horizontal ends.

Now when a collision occurs between the vehicle and an object, cover 20, broken in two, could hit an object within the vehicle without causing injury because of pillows 21 and 21' striking first. It is desirable that pillows 21 and 21' not protrude to interfere with either the driver's view or movement of his hands. With a sufficiently concave plastic cover 20, pillows 21 and 21' need not protrude above the wheel's rim to produce undesirable interference for the driver.

Figure 14:
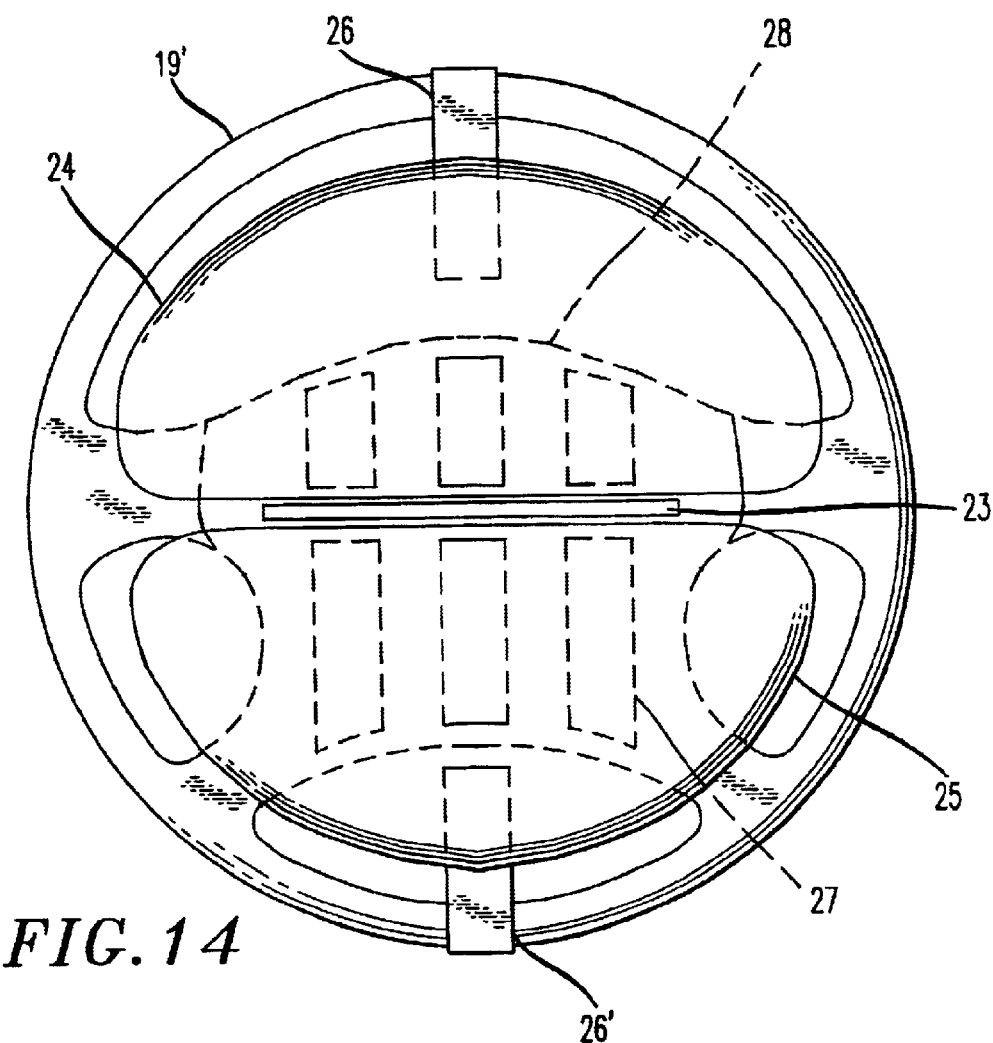
FIG. 14 is another plan view of a steering wheel with two pillows on top.

In FIG. 14, the steering wheel 19' is shown with an elongated indentation 23, along which plastic cover 28 breaks into two halves, when a collision occurs, allowing air bag underneath to suddenly inflate. FIG. 14 shows the top view of steering wheel 19', of a GEO PRIZM Chevrolet. Pillows 24 and 25 cover wheel 19' above and below indentation 23, respectively. The pillows are held on to the top of the steering wheel by Velcro strips underneath each pillow, 24 and 25, and by Velcro straps 26 and 26'. Now, when a collision occurs plastic cover 20 breaks into two pieces with a pillow attached to each half. When a plastic cover half flies in the air its attached pillow strikes an object instead of the plastic, shattering when it strikes. Now no shattering of plastic occurs because of the soft pillow making the contact. Hence, injury to auto passengers is avoided. To remove either pillow 24 or 25, simply peel off strap with Velcro 26 or 26'.

Side view of steering wheel, FIG. 3, shows pillows 21 and 21' on top of plastic cover 20. Plastic cover 20 is intended to be concave so that pillows 21 and 21' do not protrude as much above the steering wheel rim.

Figure 15:
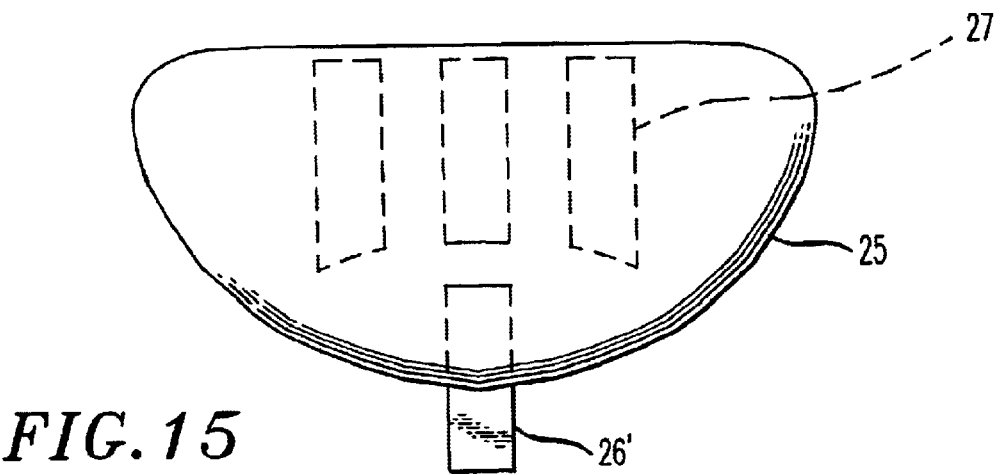
FIG. 15, is a plan view of just one single pillow with velcro strips attached

FIG. 15 shows a detailed drawing of one of the pillows 25, with Velcro strips 28 attached to its underside. End of strap 26' folds around rim of steering wheel 19'.

A sample factory-installed auto air bag with a solid cover is shown in FIG. 16, U.S. Pat. No. 5,697,630, by Nicholas Port.

Air bag module 6a contains the inflatable air bag. Steering wheel 8a contains an integral solid cover 9a over a cavity 10a to permit steering wheel 8a to mount over air bag module 6b with a thin foil closure 7a. Cover 9a is provided with at least one peripheral line or notch of weakness 11a and at least one transverse line or notch of weakness 12a. When the air bag inside module 6b suddenly inflates, cover 9a breaks along notches 11a and 12a and flies into the air to allow complete air bag inflation to occur. Pillows 21 and 21' would be mounted and fastened to the top of cover 9a, FIG. 16, avoiding notch 12a, so when the air bag inflates and cover 9a breaks, the driver would be hit by pillows, instead of solid pieces of plastic.

What is claimed is:

1. A bodily-injury protective system of soft pillows located at injury vulnerable locations within a vehicle, said vehicle having a driver seat and a passenger seat with panels in front of each, said vehicle having a steering wheel with a top, said top being a solid plastic cover for a factory-installed inflatable air bag, said system comprising:

two pillows mounted on top of said plastic cover;

a pillow mounted on said panel in front of said driver seat;

a pillow mounted on said panel in front of said passenger seat;

said plastic cover having an indented line diametrically across it, one of said two pillows mounted adjacent one side of said indented line and the other of said two pillows mounted adjacent the other side of said indented line, wherein said solid plastic cover breaks into two pieces along said indented line during air bag deployment.

2. A Bodily-injury protective system of soft pillows in accordance with claim 1, wherein said steering wheel includes a rim, said two pillows protrude above said rim, wherein a thickness of said pillows being such that pillows do not interfere with a vehicle operator.

3. Bodily-injury protective system of soft pillows in accordance with claim 1, wherein each of said two pillows include a strip with a surface of tiny hooks and another strip having a surface of clinging pile, said strip with tiny hooks being attached to the underside of each of said pillows for attaching to said strip with clinging pile located on top of said plastic cover, said strips for removably fastening said pillows to the top of said plastic cover of said steering wheel.

4. Bodily-injury protective system of soft pillows in accordance with claim 1, wherein said pillows include snap-on fasteners for removably fastening said pillows within said vehicle.

5. Bodily-injury protective system of soft pillows in accordance with claim 1, wherein each of said pillows is filled with sponge rubber.

6. Bodily-injury protective system of soft pillows in accordance with claim 1, wherein each of said pillows is filled with polyester fiber.

7. Bodily-injury protective system of soft pillows in accordance with claim 1, wherein each of said pillows includes an enclosure, said enclosure being fire, water and puncture resistant.

8. Bodily-injury protective system of soft pillows in accordance with claim 1, wherein each of said pillows have an enclosure with an underside and said enclosure having suction cups fastened to said underside, said cups capable of adhering to said solid plastic cover by suction, without interfering with the operation of said factory-installed auto air bag.

9. Bodily injury protective system of soft pillows, in accordance with claim 1, wherein said soft pillows are filled with cotton to enhance their softness.

10. Bodily-injury protective system of soft pillows in accordance with claim 1, wherein said soft pillows include an enclosure, said enclosure being air-tight, water, fire and puncture resistant.

11. Bodily-injury protective system of soft pillows in accordance with claim 2, wherein said solid plastic cover of said steering wheel, having a concave shape, so said pillows mounted on said cover do not protrude objectionably above said steering wheel to interfere with vehicle operator's vision.

* * * * *